Nov. 18, 1969  D. W. RASMUSSEN  3,478,655
APPARATUS FOR OPERATION UPON ELONGATED SECTION OF
PLASTIC CONCRETE OR THE LIKE
Filed March 27, 1967  5 Sheets-Sheet 2
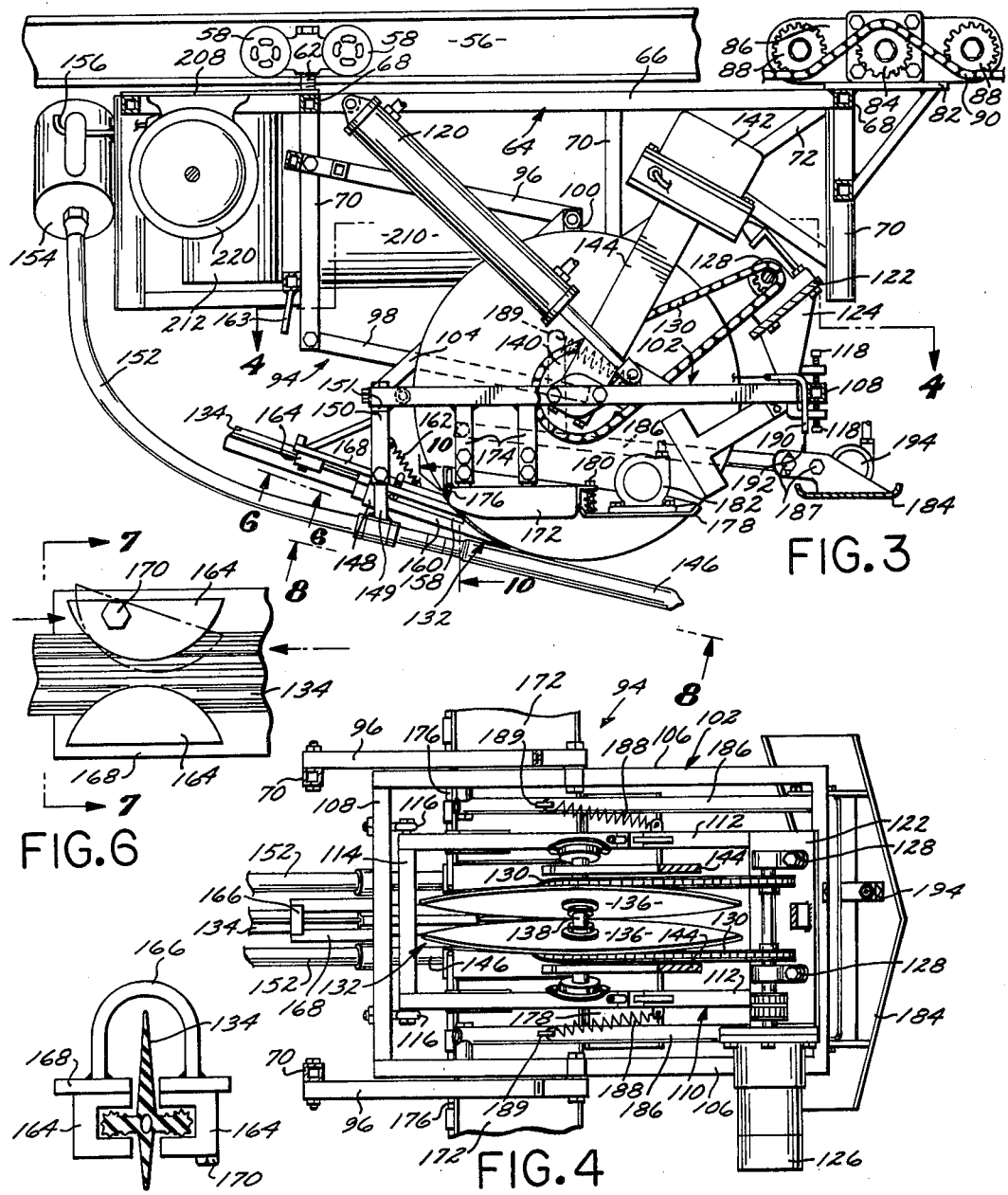
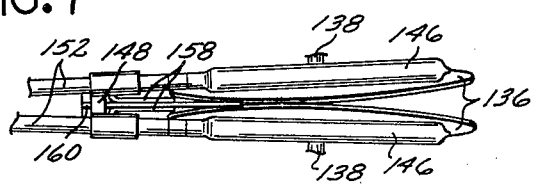
INVENTOR.
DONALD W. RASMUSSEN
BY Fulwider, Patton, Rieber
Lee and Utecht
ATTORNEYS

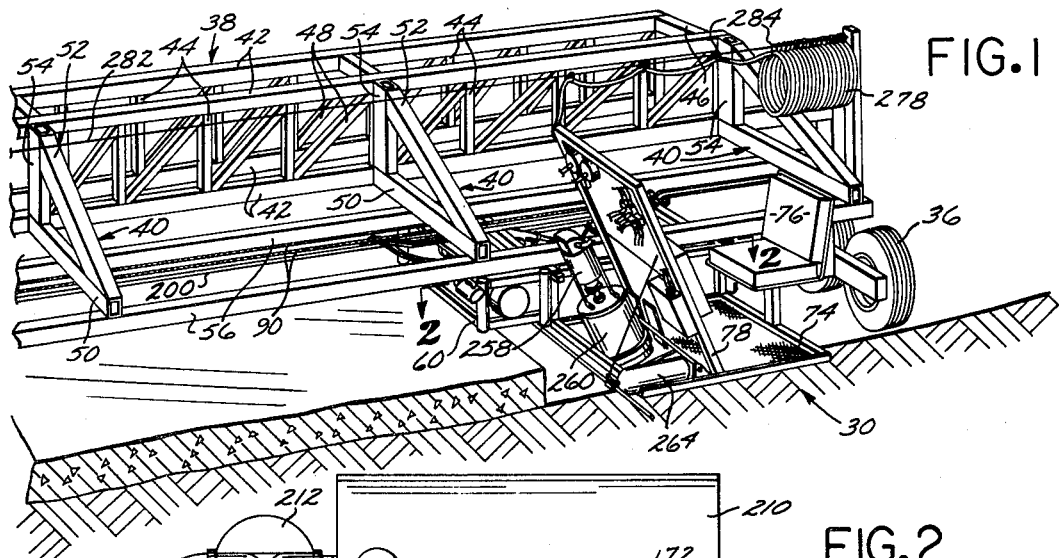

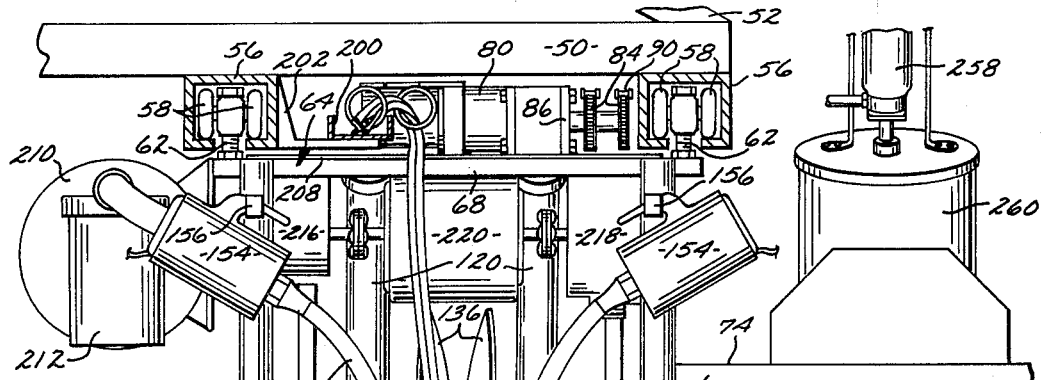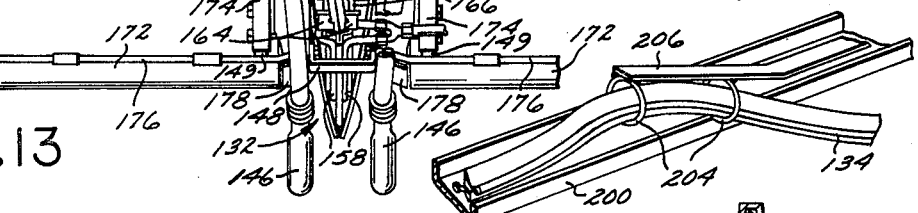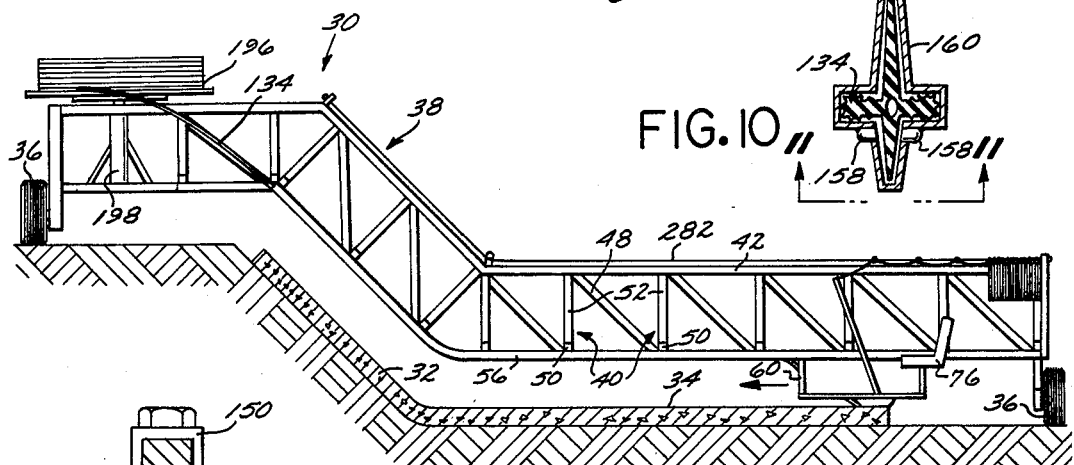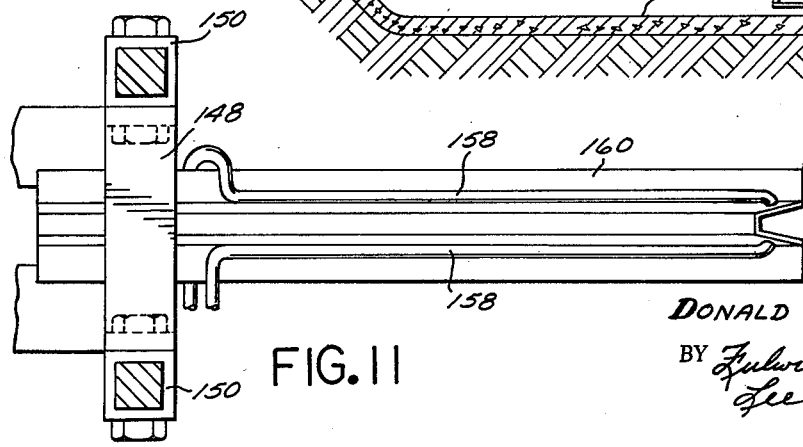

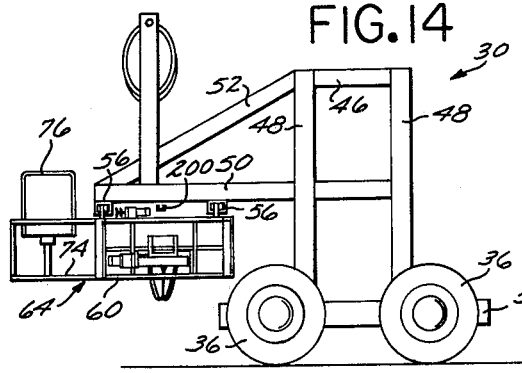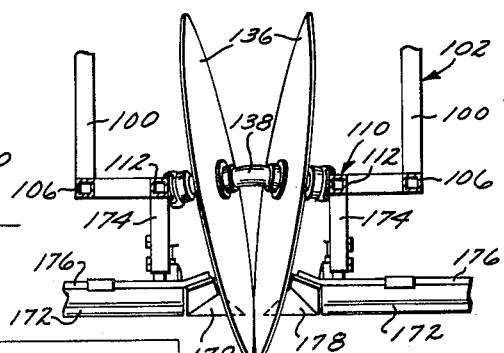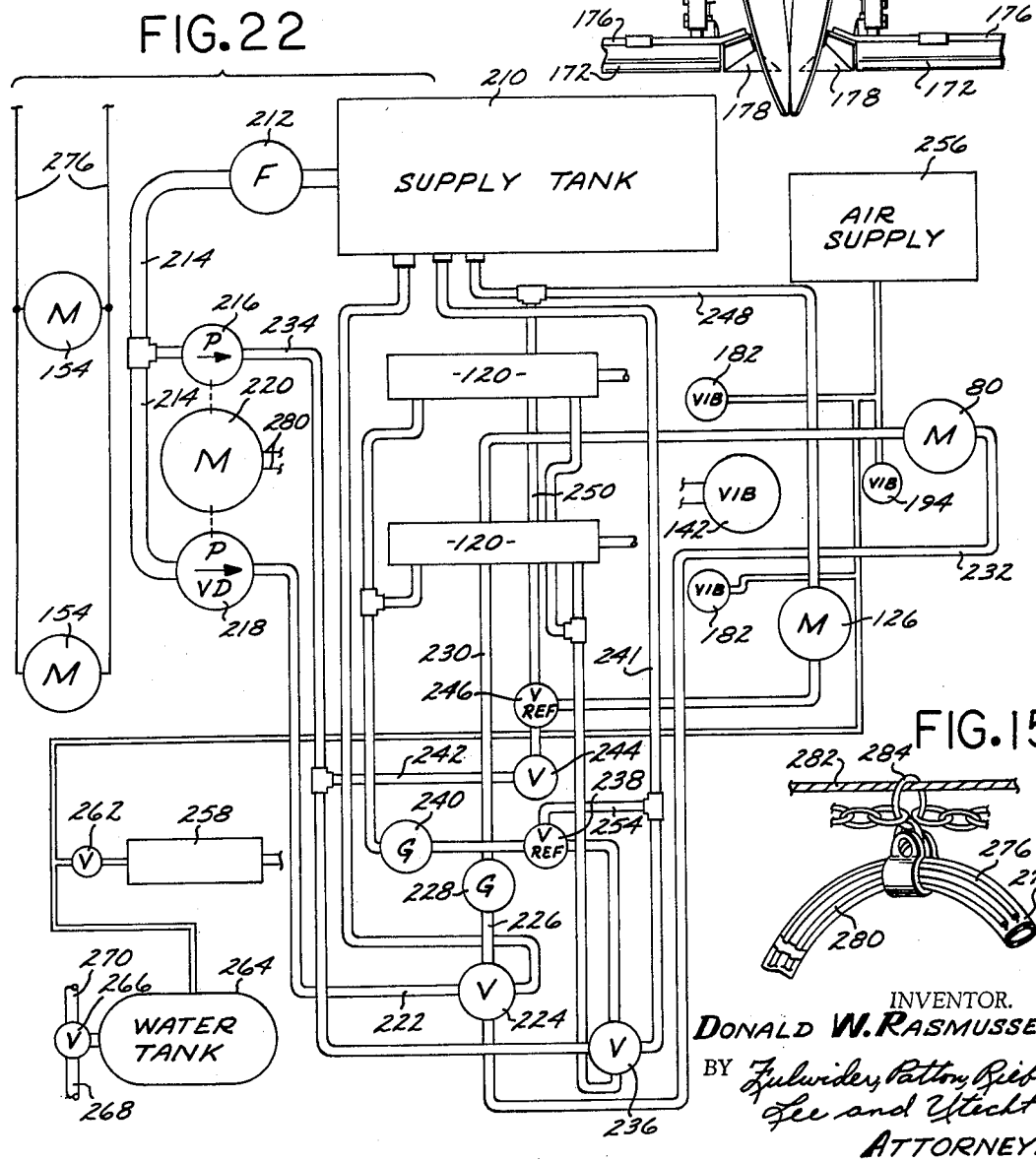

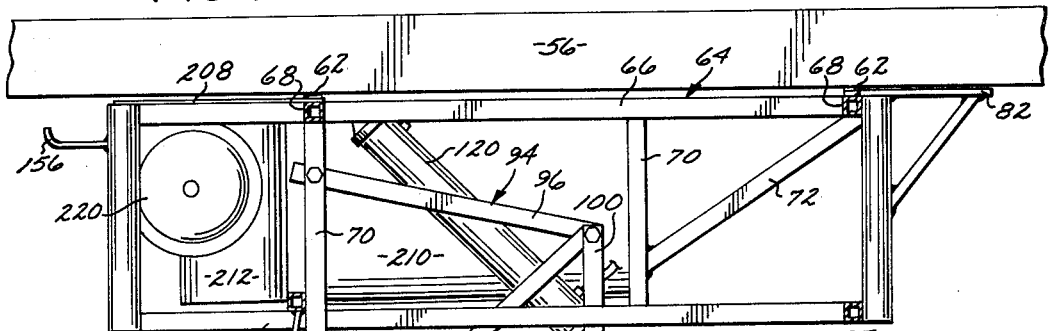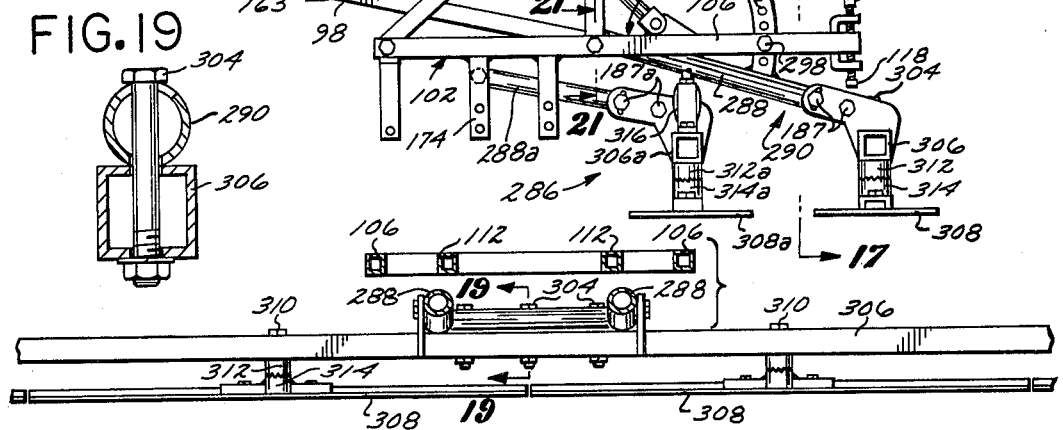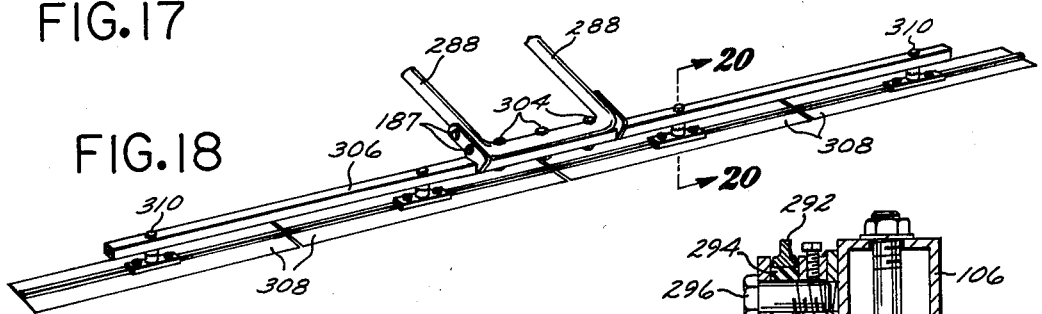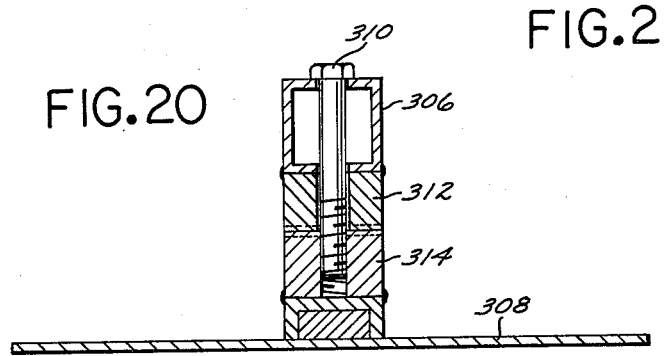

United States Patent Office 3,478,655
Patented Nov. 18, 1969

3,478,655
APPARATUS FOR OPERATION UPON ELONGATED SECTION OF PLASTIC CONCRETE OR THE LIKE
Donald W. Rasmussen, Downey, Calif., assignor to Edoco Technical Products, Inc., Long Beach, Calif., a corporation of California
Filed Mar. 27, 1967, Ser. No. 626,129
Int. Cl. E01c 23/02; E02b 5/02
U.S. Cl. 94—39                                14 Claims

ABSTRACT OF THE DISCLOSURE

An apparatus for doing work of various types upon a large expanse of plastic concrete, and particularly upon the side slope and bottom of a relatively large canal, the apparatus including an elongated frame for orientation transversely of the canal in overlying relation to the side slope and a portion of the canal bottom. The frame is transportable in successive movements along the canal for location over successive transverse sections, the frame supporting a self-propelled car movable along the frame and carrying support structure adapted to mount feeding apparatus for inserting joint former strip material in the concrete of the canal while it is in a plastic condition, or to mount smoothing apparatus for providing a trowel-like finish on the concrete.

---

The apparatus of the present application is generally related to apparatus set forth in United States Patent No. 3,274,906, entitled "Joint Installation Apparatus," issued September 27, 1966, which apparatus is operative to insert joint former strip material in a canal slope by utilization of a laying tube carried through the plastic concrete of the slope. Another related apparatus is disclosed in a divisional patent application, Serial No. 533,960, entitled "Method and Apparatus for Forming Joint Inserts in Concrete," filed March 14, 1966, which apparatus is operative to insert joint former strip material by utilizing a wheel or a pair of disks adapted to roll through plastic concrete while simultaneously carrying the strip material into position in the concrete.

The field of the present invention is the feeding of joint former strip material into the plastic concrete of the bottom and side slope of a canal or the like, and the smoothing or finishing of the disturbed portions of the concrete.

In the construction of irrigation canals and other structures characterized by comparatively large and unbroken expanses of concrete including sloping side portions, provisions must be made for thermal expansion and contraction of the concrete. One solution to this problem has been advanced in U.S. Patent No. 3,023,681, issued March 6, 1962, for "Combined Weakened Plane Joint Former and Waterstop."

Installation of an embedded joint insert of the character described in the reference patent provides a weakened plane joint in the plastic or uncured concrete, the concrete cracking along this weakened plane as it contracts during curing and hardening. The character of the joint insert also prevents water seepage downwardly through the cracks in the concrete, which is a desirable attribute in concrete linings of irrigation canals, where water seepage would constitute a serious water loss.

The joint insert of the referenced patent is of generally cruciform configuration with the weakened plane joint defined by the substantially vertically disposed portions of the cruciform shape. The horizontal portions of the cruciform configuration provide the desired water seal.

The joint insert just described must be installed rapidly and in proper orientation relative to the concrete, since the paving equipment for irrigation canals and the like operates at a comparatively high rate of speed and consequently utilizes a concrete "mix" which sets up or cures rather rapidly, particularly on hot days.

Various methods and apparatus for inserting such joint inserts have been advanced in the prior art. However, although such apparatus has generally operated satisfactorily in embedding joint inserts in flat sections of plastic concrete, such apparatus is incapable of installing such inserts to provide transverse joints along the sloping side and adjacent bottom of an irrigation canal or the like. More particularly, the prior art equipment for embedding joint inserts to provide longitudinal joints is normally associated with paving equipment so that the joint insert is laid in the concrete shortly after the concrete is deposited, distributed, and smoothed by the paving equipment. In the case of a transverse joint, the concrete is already laid and is beginning to set up or cure at the time the joint insert must be embedded to define the transverse joint. Consequently, the equipment for embedding the transverse joint insert must disturb the freshly laid concrete as little as possible. Moreover, the portion of the concrete disturbed by the transverse joint insertion must be smoothed to conform to the adjacent surface of the undisturbed concrete.

A particular difficulty in connection with the insertion of transverse joint material is the embedment of the material in the transition zone between the bottom and the side slope of the canal. In this area the insertion equipment must be capable of laying the insert material so that as the insertion continues up the side slope, the portion laid in the transition zone will not be pulled out of position. In addition, the inserting apparatus must provide proper consolidation of the disturbed or displaced concrete around the joint insert, and the smoothing of such displaced concrete desirably should provide a finish equivalent to that achieved by hand troweling. Hand troweling is the method presently employed to touch up or finish concrete disrupted by the insertion process, and also other areas of the concrete mass which were incompletely finished or missed by the main paving equipment.

Therefore, it is an object of the present invention to provide an apparatus for operation upon the plastic concrete of the bottom and side slope of an irrigation canal of the like, and which is adapted for use with feeding apparatus for inserting or embedding joint insert material to form transverse joints, and is also adapted for use with smoothing apparatus for finishing concrete which is or may be disrupted in the insertion operation, and for general finishing of concrete incompletely smoothed by the main paving equipment.

The present apparatus includes an elongated frame formed to the general configuration of the canal bottom and side slope, and supported at its opposite extremities by wheels or the like so that the frame can be transported in successive movements along the canal for location over successive transverse sections. A self-propelled car is mounted on the frame for travel transversely of the canal, and includes support structure which can be pivoted downwardly, and which is adapted to mount tool means, which can be either feeding apparatus for inserting joint former strip material, or smoothing apparatus for providing a trowel-like finish on the concrete.

It is another object of the invention to provide an apparatus of the aforementioned character in which the tool means mounted on the supporting structure, whether it be the joint insert feeding apparatus or the smoothing apparatus, is forcibly pressed downwardly against the concrete to thereby, in one case, press the joint insert material downwardly through the plastic concrete with adequate force and to a predetermined depth, or, in the other case, to press the finishing apparatus against the plastic concrete with the force necessary to provide the desired finish. A related object of the invention is the utilization of hydraulic means for forcing the support structure downwardly whereby a determination of the hydraulic pressure in the system affords an indication of the pressure which the tool means, and particularly a smoothing apparatus, is exerting upon the plastic concrete. Similarly, the car is preferably driven by hydraulic means so that measurement of the hydraulic pressure necessary to propel the car will yield an indication of the drag upon the car and thus, for example, the tension being exerted upon the joint insert material being laid.

A further object of the invention is the provision of an apparatus of the aforementioned character including a feeding apparatus having wheel or disk means for feeding and pressing the joint insert material into the concrete, and wherein such disk means is driven such that the tension on the joint insert material can be adjusted by varying the torque applied to the disk means. This is particularly important in the laying of the insert material in the transition zone of the canal between the bottom and side slope to prevent the joint insert material from being pulled out of the zone during travel of the car on the uphill side slope of the canal.

Yet another object of the invention is to provide an apparatus of the aforementioned character in combination with a smoothing apparatus having an elongated finishing means adapted to span concrete located between successive transverse joints so as to smooth the disrupted concrete in the joint areas as well as in the intervening section of concrete. The finishing means is preferably relatively narrow so as to be able to smoothly negotiate concrete in the fillet or transition zone between the canal bottom and side slope, and also is preferably constituted of a plurality of separate sections so that each section is independently accommodatable to the larger irregularities of an expanse of concrete, while yet providing localized smoothing.

Other objects and features of the invention will become apparent from consideration of the following description taken in connection with the accompanying drawings, in which:

FIG. 1 is a perspective view of the present apparatus for operation upon plastic concrete of a canal bottom and side slope, the portion of the apparatus utilized for operation upon the side slope being omitted;

FIG. 2 is an enlarged plan view taken along the line 2—2 of FIG. 1;

FIG. 3 is a view taken along the line 3—3 of FIG. 2;

FIG. 4 is a plan view taken along the line 4—4 of FIG. 3;

FIG. 5 is a front elevational view of that portion of the apparatus illustrated in FIG. 2, portions of the frame being shown in cross section;

FIG. 6 is an enlarged view taken along the line 6—6 of FIG. 3;

FIG. 7 is a view taken along the line 7—7 of FIG. 6;

FIG. 8 is a view taken along the line 8—8 of FIG. 3;

FIG. 9 is a front elevational view of the feeding means illustrated in association with the present apparatus in FIGS. 1 through 15;

FIG. 10 is an enlarged view taken along the line 10—10 of FIG. 3;

FIG. 11 is a view taken along the line 11—11 of FIG. 10;

FIG. 12 is an enlarged perspective view of the means for guiding the joint strip material from the frame and on to the feeding apparatus;

FIG. 13 is a rear elevational view of the apparatus of FIG. 1, showing the orientation of the frame relative to the canal side slope and adjacent bottom, but omitting a number of details for simplicity;

FIG. 14 is a right end elevational view of the apparatus illustrating the orientation of the car relative to the frame, but omitting certain details for simplicity;

FIG. 15 is a detail perspective view illustrating the manner in which the power and air lines are carried by the frame for movement with the car;

FIG. 16 is a side elevational view of the apparatus of FIG. 1, but modified by elimination of those components associated with the insertion of joint former material, and instead illustrating the components of the tool means or smoothing apparatus associated with the main apparatus for the purpose of providing a trowel-like finish on plastic concrete;

FIG. 17 is a view taken along the line 17—17 of FIG. 16, portions being cut away for simplicity;

FIG. 18 is a perspective view of the smoothing apparatus of FIG. 16;

FIG. 19 is an enlarged view taken along the line 19—19 of FIG. 17;

FIG. 20 is an enlarged view taken along the line 20—20 of FIG. 18;

FIG. 21 is an enlarged view taken along the line 21—21 of FIG. 16; and

FIG. 22 is a diagrammatic showing of the various hydraulic, air, and water lines and the components of the apparatus to which they are coupled.

GENERAL ARRANGEMENT

Referring now to the drawings, and particularly to FIGS. 1 through 15, the present apparatus for operation upon plastic concrete of a canal bottom and side slope is designated generally by the numeral 30. As will be seen, the apparatus 30 is adapted for use in conjunction with either a feeding apparatus for inserting joint former strip material, or a smoothing apparatus for providing a trowel-like finish on concrete, the first of these embodiments being illustrated in FIGS. 1 through 15 and the second of these embodiments being illustrated in FIGS. 16 through 21.

The apparatus 30 is adapted to be transported by any suitable towing or propelling apparatus (not shown) which can be coupled to the apparatus 30 for transportation of the apparatus 30 in successive movements along an irrigation canal or the like for location over successive transverse sections of the canal.

As best seen in FIGS. 1 and 13, the apparatus 30 overlies the side slope 32 and adjacent bottom 34 of the canal, and is adapted to roll upon rails (not shown) or tractor tracks (not shown) or upon pneumatic tires 36. The upper tire 36 rolls upon the prepared grade at the top of the canal and the lower tire 36 rides either upon the prepared grade of the canal bottom or upon a set up or cured concrete slab (not shown) forming a part of a completed portion of the canal.

The main apparatus 30 includes an elongated frame 38 constituted generally of a plurality of tubular members which are arranged so as to extend transversely in overlying, parallel relation to the canal bottom 34, and upwardly in parallel, overlying relation to the canal side slope 32.

The main portion of the frame 38 is essentially box-like in construction, and from this main portion a plurality of spaced apart, triangularly shaped rail supports 40 extend rearwardly in cantilever fashion. The frame 38 is constituted of a plurality of longitudinal elements 42 connected together by vertical elements 44, horizontal elements 46, and diagonal truss elements 48.

Those vertical elements 44 at the extremities of the box-like portion of the frame 38 each support a wheel mount 50 to which the wheels and tires 36 are mounted.

The cantilevered rail supports 40 each comprise a laterally or outwardly extending horizontal element 50, a diagonal element 52, and a vertical element 54 which is welded or otherwise rigidly secured to the remaining structure of the frame 38. As will be seen, the rail supports 40 serve to cantilever the weight of the self-propelled car and its associated apparatus.

A pair of channels are welded in spaced relation along the underside of the rail supports 40, and extend coextensive with the frame 38. Each of the channels is open at the bottom and includes inwardly extending flanges which define a rail 56 to support, respectively, the bogies or wheels 58 of a self-propelled car 60. The tracks or rails 56 follow the contour of the underside of the frame 38 so as to parallel the bottom and side slope of the canal.

THE CAR

There are four sets of twin wheels 58 which support the car 60 on the rails 56. Each of the sets of wheels 58 is rotatably carried by a wheel bearing which is secured to a threaded stud 62, as best seen in FIGS. 2 and 5, which extends upwardly from a car frame 64. The frame 64 is rectangular and the four studs 62 are secured at the rear corners and adjacent the forward corners of the car frame 64. The framework of the car frame 64 is constituted, generally, of a plurality of longitudinal members 66, transverse members 68, vertical members 70, and truss members 72 welded or otherwise rigidly secured together to form a rigid structure to support other components of the present apparatus 30, as will be seen.

As best seen in FIGS. 1 and 5, the car frame 64 also supports a rectangular, laterally extending, and horizontally oriented platform 74 which carries a seat 76 for the operator, and also mounts a control console 78 for operation of the apparatus 30.

As best seen in FIGS. 2 and 3, the car 60 is driven by a hydraulic motor 80 which is secured to a plate or motor mount 82 welded to a transverse member 68 and to a vertical member 70 of the car frame 64 at the rearward end thereof. The motor 80 drives a pair of drive sprockets 84 mounted in spaced apart relation on the motor shaft, which extends through and is rotatable relative to the sprocket mounting bracket 86. In addition, complemental pairs of idler sprockets 88 are rotatably mounted upon stub shafts which are secured to the sprocket mounting bracket 86 on either side of the pair of drive sprockets 84.

The idler sprockets engage a pair of stationary chains 90 which are trained about the pairs of idler sprockets 88, the chains 90 extending in parallel relation along the length of the main frame 38. Although not illustrated, the opposite ends of the chains 90 are secured to the opposite ends of the main frame 38, being trained beneath and held down by the horizontal elements 50. The elements 50 maintain the chains 90 in a path generally following the contour of the car frame rails 56 so that rotation of the drive sprockets 84 is effective to drive the car 60 along the length of the main frame 38.

SUPPORT STRUCTURE

A support structure 94 is carried by the car 60 and, in turn, supports either feeding apparatus for embedding joint insert material or smoothing apparatus for finishing the concrete of the canal, as will be seen.

The support structure 94, as best seen in FIGS. 2 and 5, includes a parallelogram-like linkage comprising a pair of transversely spaced apart upper arms 96 which are pivotally connected at their forward extremities to the upper extremities of a pair of the vertical members 70 of the car frame 64; a pair of transversely spaced apart lower arms 98 which are pivotally connected at their forward extremities to the lower ends of the same pair of vertical members 70 of the car frame 64; and a pair of vertical 100, only a portion of one being shown in FIG. 3. The members 100 are pivotally connected at their upper ends to the rearward ends of the upper arms 96, and at their lower ends to the rearward ends of the lower arms 98.

The parallelogram-like linkage just described is pivotable upon the car frame 64 to raise and lower a generally horizontally oriented, rectangular support frame 102 by means of a pair of transversely spaced apart diagonal arms 104 which are welded or otherwise rigidly secured at their opposite ends to the forward end of the support frame 102 and to the upper ends of the vertical members 100 of the parallelogram-like linkage. Thus, the support frame 102 is maintained in a horizontal orientation in all of the pivoted positions of the parallelogram-like linkage.

The support frame 102 includes a pair of longitudinal members 106 and a pair of transverse members 108 which are rigidly secured together to form a rectangle. These members, in turn, support a rectangular auxiliary frame 110 which includes longitudinal members 112 welded at their ends to the ends of a pair of transverse members 114, only one of the members 114 being illustrated in FIG. 4.

The auxiliary frame 110 is adjustably pivotally oriented within the support frame 102. More particularly, the forward end of the auxiliary frame 110 is pivotally supported by a pair of brackets 116 which are secured to a transverse member 108 at the forward end of the support frame 102. At the rearward end of the auxiliary frame 110, a C-shaped adjustment bracket is fixed to the adjacent transverse member 114, with the upper and lower sections of the C-shaped structure of the bracket overlying and underlying, respectively, the rearward transverse member of the support frame 102. A pair of threaded studs or adjusting screws 118 are disposed through such upper and lower sections of the adjustment bracket for engagement with the upper and lower sides of the adjacent transverse member 108 of the support frame 102 so that adjustment of the position of the screws 118 adjusts the pivoted position of the auxiliary frame 110 relative to the support frame 102. As will be seen, this adjusts the angular orientation of the feeding apparatus which embeds the joint insert material in the plastic concrete of the canal.

A pair of double-acting hydraulic cylinders 120 and their pistons are each pivotally connected, respectively, to the car frame 64 and to the support frame 102, the cylinders 120 being operative to raise and lower the support frame 102 relative to the car frame 64.

A sprocket mounting plate 122 is supported in inclined relation with respect to the auxiliary frame 110 by a pair of vertical plates 124 which are welded to the sprocket mounting plate 122 and to the rearward one of the transverse members 114 of the auxiliary frame 110. The sprocket mounting plate 122 also rigidly mounts a hydraulic motor 126 whose shaft is rotatably supported by a pair of bearing blocks 128 secured to the sprocket mounting plate 122. In addition, the shaft of the motor 126 mounts a pair of drive sprockets (not visible in the drawings) for driving a pair of chains 130 to thereby drive the feeding apparatus for embedding the joint insert material, as will be seen.

TOOL MEANS

The support structure 94 mounts a tool means which, in the embodiment of FIGS. 1 through 15, is constituted by a feeding apparatus 132 for embedding a continuous strip of joint insert material 134 in the plastic concrete of the canal. The feeding apparatus 132 includes a pair of discs 136 rotatably carried upon a transversely oriented shaft 138 which is bent or deformed to define a pair of axes which are oppositely inclined relative to a horizontal axis, thereby orienting the inner surfaces of the discs in downwardly convergent relation to locate the lower peripheries thereof in closer proximity than the upper peripheries thereof. As will be seen, the proximity of the lower peripheries of the discs 136 permits engagement, carrying, and release of the joint insert material 134 during rotation of the discs 136. The general operation of the discs 136 is more particularly set forth in copending United States patent application Serial No. 533,690, filed March 14, 1966, entitled "Method and Apparatus for Forming Joints in Concrete," and assigned to the assignee of the present patent application.

The opposite ends of the shaft 138 carrying the discs 136 are rigidly secured to the confronting longitudinal members 112 of the auxiliary frame 130. The chains 130 are trained about a pair of driven sprockets 140 which are attached to the discs 136 and rotatably mounted on the shaft 138 so that operation of the motor 126 is effective to rotate the discs 136.

A usual and conventional electric vibrator 142 is located above the discs 136 and is supported in position by means of a pair of vibrator brackets 144 which are mounted to the fixed shaft 138 on opposite sides of the discs 136. Operation of the vibrator 142 is effective to vibrate the discs 136 and thereby facilitate formation of a path through the plastic concrete and embedment of the joint insert material 134, while also promoting proper distribution of the plastic concrete about the embedded material 134.

As best viewed in FIGS. 3 and 5, an additional pair of mechanically actuated vibrators 146 are located below the discs 136, projecting downwardly and rearwardly thereof. The forward ends of the vibrators 146 are located on opposite sides of the discs 136 and are supported in position by attachment to the lower ends of vertical elements 149 which are vertically telescopably adjustable within the pair of depending legs of a U-shape element 150 which is bolted to the support frame 102 with a resilient pad 151 interposed therebetween. Operation of the vibrators 146 also serves to facilitate insertion of the joint insert material 134 and proper distribution of the plastic concrete about the embedded material 134. In this regard, the vibrators 146 are operated through a pair of flexible shafts 152 which are connected to a pair of usual and conventional electric vibrator motors 154 which hang upon suitable brackets 156 welded to the forward end of the car frame 64.

In laying transverse sections of the joint insert material 134 with the present apparatus 30, it is often necessary to cut across similar sections of the material 134 which have been previously laid in a longitudinal direction. At the points of intersection, as is known to those skilled in the art, the upper web or projection of the longitudinal length of the material 134 is notched or, alternatively, the material 134 is slit to accommodate the downwardly projecting web or portion of the transverse section of insert material 134. Desirably, the slit sections should be adhered together or sealed relative to one another to prevent downward penetration of water in the slit area. Accordingly, the present apparatus includes a pair of tubes 158 for carrying adhesive or sealant material to the slit areas from a suitable source, which source will be described in more detail hereinafter. The tubes 158 are supported in rearwardly and downwardly projecting relation relative to the forward, lower edge portions of the discs 136 by suitable attachment to a similarly oriented hollow, cruciform insert guide 160, as best seen in FIG. 10. The tubes 158 are rigidly adhered to the undersides of the lateral wings of the guide 160 in the corners where the lateral wings intersect that portion of the guide 160 which extends downwardly to accommodate the lower leg or web of the cruciform-shaped joint insert material 134. The ends of the tube 158 then pass through suitable openings in the guide 160 so as to be located adjacent the material 134 just before it leaves the guide 160. This prevents concrete from interfering with deposition of the adhesive upon the material 134.

The guide 160 closely and slidably accommodates the joint insert material 134 in order to precisely orient the material 134 for grasping by the discs 136. For this purpose, the forward end of the guide 160 is located immediately adjacent the lower, forward edge portions of the discs 136, and is made arcuate in order to conform to the curvature of the periphery of the discs 136 at that point.

As best viewed in FIG. 3, the insert guide 160 hangs on the support frame 102 by weldment to a U-shaped bracket 148 which is pivotally bolted to the pair of vertical elements 150. In addition, a tension spring 162 is connected between the frame 102 and the guide 160 to bias the guide 160 upwardly and thereby maintain the upper surfaces of the lateral wings of the guide 160 in contact with the adjacent edges of the discs 136. In this position the upward extension or fin of the guide 160 extends between but out of contact with the discs 136.

With this arrangement, the joint insert material 134 can be pulled from the guide 160 by the squeezing action of the lower portions of the discs 136 upon the upwardly projecting leg or fin of the joint insert material 134 as it passes from the insert guide 160. Moreover, the location of the tubes 158 is such that when adhesive material is forced through the tubes 158, such adhesive material will be extruded onto or deposited upon the joint insert material 134 at those points where the material 134 is laid into the slitted areas of any longitudinally oriented, previously laid sections of similar joint insert material 134.

In order to unreel the material 134, as will be seen, it is desirable to prevent the material 134 from moving forwardly, that is, in a direction opposite its normal rearward movement through the insert guide 160. This is accomplished by raising the support structure 94 and jamming or binding the material 134 against a lock plate or tab 163 welded to the car 60, as seen in FIG. 3. Alternatively, this can also be accomplished by a pair of stop cams 164, which are best seen in FIGS. 3, 6, and 7.

The stop cams 164 are mounted to a guide 166 of inverted U-shape which is secured at its rearward extremity to a vertical member (not shown) extending upwardly of and rigidly secured to the support frame 102. A diagonal brace 168 is also fixed to the support frame 102 and to the forward extremity of the guide 166 to fix the guide 160 in position.

Each of the stop cams 164 is C-shape in configuration, with the openings therein in confronting relation to accommodate the lateral wings of the joint insert material 134. The upper leg or web of the material 134 extends into the open area of the guide 166 which is defined by the U-shape thereof. One of the cams 164 is rigidly secured to the underside of the guide 166, while the other cam 164 is pivotally mounted in eccentric fashion to the guide 166 by a stud 170. The eccentric mounting of the pivotable cam 164 by the stud 170 causes the pivotable guide 164 to pivot, engage, and constrain the material 134 whenever the material tends to move in the undesired forward direction.

The discs 136 not only deposit or embed the joint insert material 134 in the plastic concrete, but also simultaneously form a path through the plastic concrete to facilitate such insertion. The depth of insertion of the material 134 and the consequent disruption of the concrete are taken care of by a series of pans and finishing trowels. More particularly, a pair of oppositely extending, horizontally oriented pans 172 are bolted to vertical elements 174 which are integral with and extend downwardly on oppoiste sides of the support frame 102, as best viewed in FIGS. 2, 3, and 4. As seen, the position of the pans 172 is adjustable in a vertical direction. Each of the pans 172 is substantially rectangular in configuration, being upwardly curved at its forward edge to facilitate riding over the plastic concrete on opposite sides of the discs 136. The vertical position of the pans 172 controls the depth of the discs 136 in the concrete, thereby controlling the depth of embedment of the material 134. In this regard, only moderate pressure is applied to the cylinders 120 so that the support structure 94 can ride up and down with the pans 172 as they negotiate the sometimes irregular surface of the plastic concrete.

Each of the pans 172 includes a plurality of hinge knuckles at its forward edge which pivotally accommodate a pair of laterally extending hinge pins 176 which are fixed to opposite sides of a central pan 178 which is located between the pans 172 and immediately adjacent the discs 136.

The central pan 178 is T-shaped in configuration, having a central portion located between the lateral pans 172 and extending rearwardly, at which point the pan 178 extends outwardly on opposite sides of the discs 136 to define lateral portions located behind and overlapping part of the path of travel of the adjacent lateral pans 172. The lateral portions of the central pan 178 are each characterized by an upturned edge immediately behind the pans 172, at which point an upwardly extending stud 180 is secured. The pair of studs 180 each extends upwardly through an opening in a bracket attached to the rearward edge of the adjacent lateral pan 172, and a compression spring is mounted on the stud 180 between the pans 172 and 178 so as to bias the central pan 178 downwardly while yet permitting the central pan 178 to ride upwardly to accommodate itself to irregularities in the plastic concrete being smoothed.

A pair of fluid actuated vibrators 182 are also mounted on the lateral portions of the central pin 178 and are operable to vibrate the central pan 178 to enhance its smoothing or finishing action and its function of crowding the disrupted concrete back toward the discs 136.

A final finishing pan 184 is located behind the discs 136, and diverges outwardly in a forward direction to further crowd or gather concrete inwardly toward the discs 136 to effect a final finishing of the disrupted concrete behind the traveling discs 136. The pan 184 is pivotally secured to the base portion of a U-shaped structure whose sides form rearward extremities of a pair of upwardly and forwardly extending support arms 186. The arms 186 are pivotally secured to stud shafts fixed to a pair of the depending vertical elements 174 which are integral with the support frame 102. The pivoted position of the pan 184 relative to the arms 186 is fixed by tightening a pair of bolts 187. This adjusts the concrete finishing angle of the pan 184.

The finishing pan 184 is biased in a downwardly pivoted position by a pair of tension springs 188 having their upper or forward ends secured to the upper ends of a pair of upwardly projecting elements 189 which are welded to the arms 186. The opposite ends of the springs 188 are secured to the longitudinal members 112 of the support frame 102.

A wire guide tube 190 is secured to the support frame 102, as best viewed in FIG. 3, and slidably accommodates a wire 192 which is fastened at its lower end to one of the arms 186 of the finishing pan 184. As will be seen, the wire 192 extends upwardly to the control console 78, where it can be pulled by the operator to raise and lower the finishing pan 184, as desired.

A fluid actuated vibrator 194 is mounted to the finishing pan 184, as best viewed in FIG. 3, and is operable to vibrate the pan 184 and thereby facilitate the smoothing action of the pan.

Referring now to FIGS. 5, 12, anad 13, the joint insert material 134 is coiled upon a supply spoil 196 which is supported for rotation about a vertical axis by a shaft carried by the frame 38 adjacent the forward or uphill extremity thereof. From the spool 196 the material 134 is drawn along a track which is defined by a channel 200 coextensive with the frame 38. The channel 200 is welded to a plurality of support brackets 202 which are welded to the adjacent rail 56 of the frame 38. The strip material 134 is picked off and guided from the channel 200 by a pair of guide rings 204 which are welded to the forward extremity of a forwardly projecting strap 206 whose rearward extremity is welded to a horizontal mounting plate 208 forming a part of the car 60.

CONTROL MEANS AND POWER SOURCES

With particular reference to FIG. 15, and FIGS. 1, 2, 3, and 5, a reservoir or supply tank 210 holding a supply of hydraulic fluid is welded to one side of the car frame 64, as best seen in FIG. 2. Hydraulic fluid from the supply tank 210 passes through a usual and conventional filter 212 supported by the supply tank 210, and then through a line 214 to a pair of hydraulic pumps 216 and 218, which are illustrated in dotted outline in FIG. 2, and which are secured to the underside of the mounting plate 208 which forms a part of the car frame 64. Both pumps 216 and 218 are driven by an electric motor 220 also mounted to the underside of the mounting plate 208. The pump 218 is preferably one which is capable of being controlled to provide a variable volume output to vary the rate of movement of the car 60, as will be seen.

The output of the pump 218 is carried through a line 222 to a two-position valve 224, which, as will be seen, has the effect of applying the output of the pump 218 to one or the other side of the hydraulic motor 80 to thereby drive the car 60 in one direction or the other relative to the frame 38. In the position illustrated, the valve 224 applies hydraulic fluid through a line 226 to a gauge 228, which indicates the hydraulic pressure on the line. The gauge reading indicates the drag or resistance to movement of the car 60, which is particularly important when the present apparatus is used for finishing purposes, as will be more particularly described in conjunction with the embodiment of FIGS. 16 through 21.

From the gauge 228 the hydraulic fluid passes through a line 230 to one side of the motor 80 to drive the car 60 in one direction. The hydraulic fluid is then exhausted or discharged from the motor 80 through a line 232, back through the two-position valve 224, through a line 241 and then to the supply tank 210. As will be apparent, when the valve 224 is rotated through an angle of 90 degrees, the hydraulic fluid will then be applied to the other side of the motor 80 to drive the car 60 in the opposite direction.

The output of the other pump 216 is employed for both the driving of the discs 136 and for the operation of the double acting cylinders 120 which pivotally raise and lower the support frame 102 and the discs 136. More particularly, output fluid from the pump 216 is carried through a line 234 to a two-position valve 236 and, in the illustrated position of the valve 236, the fluid then passes to a usual and conventional pressure control valve 238 and then to a gauge 240. The pressure indication afforded by the gauge 240 is useful to determine the amount of hydraulic pressure which is being applied to maintain the discs 136 at the depth selected for insertion of the joint insert material 134. From the gauge 240 the hydraulic fluid is applied to one side of each of the pairs of cylinders 120 to pivot the support frame and the associated discs 136 downwardly, the fluid discharged from the cylinders 120 being carried back through the valve 236 to the supply tank 210. When the valve 236 is rotated through an angle of 90 degrees, the fluid from the pump 216 is applied to the opposite sides of the cylinders 120 to thereby raise the support frame and the discs 136.

The vertical position of the discs 136 is controlled by the pressure control valve 238 which is operative to vent a portion of the hydraulic fluid through a line 254 to the discharge line 241. With this arrangement the valve 238 can be operated to vary the pressure applied to either side of the cylinders 120 to thereby control the extent of pivotal movement of the support frame 102 and the discs 136.

As previously indicated, the output of the pump 216 is also utilized to drive the motor 126 which rotates the discs 136. More particularly, a portion of the hydraulic fluid from the pump 216 is applied through a line 242 to an on-off valve 244, then through a usual and conventional pressure control valve 246, and then to the motor 126 to drive the discs 136 in a counterclockwise direction, as viewed in FIG. 3. The discharge fluid from the motor 126 is then carried through a line 248 back to the supply tank 210. It is noted that the discs 136 are always driven in the same direction, and therefore the valve 244 is utilized only to turn on or shut off fluid to the motor 126.

The pressure control valve 246 is operative to vent or carry away a portion of the fluid otherwise applied to the motor 126, the vented portion of fluid passing through a line 250 to the discharge line 248. By operation of the valve 246, the fluid pressure at the motor 126 can be varied to thereby vary the rate of rotation of the discs 136. This is particularly important to insure that the joint insert material 134 is not subjected to undue tension. If the material 134 is under excessive tension, it will tend to pull out of the plastic concrete, particularly during its embedment in the transition zone between the bottom 34 and the side slope 32 of the canal. As previously indicated, excessive tension is indicated by the pressure reading at the gauge 228.

The gauges 228 and 240, and the relief valves 238 and 246 are located on the control console 78 for use by the operator, as best viewed in FIG. 2.

Compressed fluid, preferably compressed air, is supplied by a usual and conventional portable compressor or the like (not shown) which is located out of the work area. However, for descriptive purposes the compressor is indicated at 256 in FIG. 22. From the compressor 256 compressed air is supplied to various vibrators of the present apparatus 30. More particularly, compressed air is applied to the pair of vibrators 182 to vibrate the central pan 178, to the vibrator 194 to vibrate the finishing pan 184. The electrical vibrators 142 are suitably energized to vibrate the discs 136.

A portion of the compressed air from the air compressor 256 also passes to an air actuated cylinder 258, as best seen in FIGS. 1 and 2, mounted on top of a container 260 which holds adhesive material for application by the tubes 158. The container 260 is rigidly secured to the platform 74, and the piston of the air cylinder is coupled to a piston (not shown) within the container 260 to force the adhesive material out of the container 260 and through the tubes 158 whenever the air cylinder 258 is actuated. The line to the air cylinder 258 includes a valve 262 which is most conveniently actuated by a foot pedal or the like (not shown) located on the operator's platform 74. Depression of the pedal opens the valve 262 to apply air to force the adhesive material through the tubes 158 at such time as desired.

A portion of the compressed air is also applied to a water tank 264. Discharge of water from the tank 264 is controlled by operation of a valve 266 which allows water to flow through a pair of lines 268 and 270, as best viewed in FIG. 2. The lines 268 and 270 include a plurality of spray apertures (not shown) for spraying the water upon the plastic concrete ahead of the apparatus 30. This is occasionally necessary when the plastic concrete has "set up" to the point where it is difficult to work and finish. The valve 226 is conveniently controlled through a pull rod 272 which is actuated by a knob 274 located on the control console 78.

The pair of electric motors 154 which actuate the vibrators 146 located below the discs 136 are also illustrated in FIG. 22. The motors 154 are connected by electrical leads 276 to any suitable source of power. As best seen in FIG. 15, the leads 276 are carried in a cable which is clamped to an air hose 278 which carries the air from air compressor 256 to the apparatus 30. In addition, an electrical cable 280 supplying power to the motor 220 is also strapped to the air hose 278.

The air hose 278 and the cables 276 and 280 are carried by a plurality of rings 284 which are longitudinally slidable along the length of a line 282 which extends the full length of the frame 38, as best viewed in FIGS. 1 and 13. The rings 284 slide along the line 282 as the car 60 moves back and forth along the frame 38.

OPERATION

The apparatus 30 is positioned along the particular area of the plastic concrete in which a transverse joint is desired. For this purpose, the apparatus 30 can be pulled along by any suitable motive means, with the apparatus rolling on the wheels 50 located at the extremities of the frame. After suitable connection has been made to an electrical power source and to an air compressor located nearby, the operator actuates the valve 224 to bring the car 60 back along the rails 56 to the downhill extremity of the frame 38. Next, the valve 236 is operated to pivot the support frame 102 and discs 136 downwardly, with adjustment being made by the pressure control valve 238 to position the discs 136 within the plastic concrete to the desired depth.

The valve 224 is again actuated to move the car 60 in an uphill direction, and the valve 244 is also actuated to energize the motor 126 for rotation of the discs 136. In this regard, the pressure control valve 246 is adjusted to provide the desired rate of rotation of the discs 136. Both of the gauges 228 and 240 are monitored to determine the drag upon the car 60, and to determine the pressure required to keep the discs 136 at the proper depth, respectively.

During this time, the vibrators 142, 182, and 194 effect vibration of their associated components to facilitate insertion of the joint insert material 134 and to provide good consolidation of the plastic concrete in the area of the embedment. This operation is continued until the car 60 reaches the uphill extremity of the frame 38, at which time the discs 136 are raised out of the concrete, the car 60 moved back to its original or starting position, and the whole apparatus 30 indexed or moved forwardly to the next transverse joint area.

SMOOTHING APPARATUS

The foregoing description has been directed to the association of the feeding apparatus 132 with the overall structure of the apparatus 30 to embed the joint insert material 134 in the plastic concrete.

In the construction of irrigation canals and like expanses of plastic concrete, it is frequently necessary to finish or smooth the concrete in those areas which are missed or incompletely finished by the main concrete laying and finishing apparatus. That is, if it is desired to more completely finish the concrete in the area disrupted and smoothed by the above-described feeding apparatus 132, or if it is desired to touch-up or finish other areas of the concrete intermediate the transverse joints, the apparatus 30 is extremely useful in association with a smoothing apparatus 286, which is illustrated in FIGS. 16 through 21. Use of the apparatus 30 in conjunction with the smoothing apparatus 286 has been successful in eliminating the use of many workmen using individual hand trowels.

Referring now to FIGS. 16 through 21, the structure is essentially identical to the structure described above in connection with the embodiment of FIGS. 1 through 15, except for the substitution of the smoothing apparatus 286 for the feeding apparatus 132. In addition, certain other differences exist by reason of the elimination of vibrators and the like which are preferably not used in association with the smoothing apparatus 286.

More particularly, the longitudinal members 106 of the support frame 102 are utilized to support the upwardly and forwardly extending arms 288 of a U-shaped support 290. As best viewed in FIG. 21, the support 290 is made of tubular material, and the upper end of each of the arms 288 is pinched and welded to a collar 292 having a central bore which supports a bearing 294. The bearing 294 is rotatably carried by a transversely oriented bolt 296 secured to the adjacent longitudinal member 106 of the support frame 102. With this arrangement, both of the arms 288 are pivotally carried by the support frame 102. This pivotal arrangement permits the angular attitude of the smoothing apparatus 286 relative to the plastic concrete to be varied, as will be seen.

The degree of pivotal movement is fixed by disposition of a bolt 298 through the longitudinal member 106 of the support frame 102, and through one of a series of arcuately arranged and spaced openings 300 provided in an arcuate bracket 302 which is welded to the adjacent arm 288. The same adjustment arrangement comprising the bolt 298 and bracket 302 is provided for each of the arms 288.

At the lower extremity of the arms 288, they are integrally joined by a center section which receives a plurality of bolts 304. The bolts secure the arms 288 to a support tube or rod 306 which extends transversely of the apparatus 30. The bolts 187 can be loosened to adjustably tilt the rod 306 relative to the arms 288, in the same manner described in connection with the finishing pan 184 of the feeding apparatus 132.

As best viewed in FIG. 20, a plurality of elongated finishing trowels or "Fresno" blades 308 extend beneath the rod 306 in end-to-end relation. Each of the blades 308 is secured to the rod 306 by a bolt 310 which passes through the rod 306, passes through the upper one of a complemental pair of connectors 312 and 314, and threads into the lower connector 314. The connector 312 is welded to the rod 306, and the connector 314 is welded to the associated one of the blades 308, as best viewed in FIG. 20.

The engaged faces of the connectors 312 and 314 are toothed so that relative pivotal movement, in a horizontal plane, between the rod 306 and the blades 308 is prevented when the bolt 310 is drawn up tight. However, when the blades 308 are drawn by the car 60 in an uphill direction to smooth the plastic concrete, it is sometimes desirable to have the blades 308 canted or pivoted slightly relative to the rod 306. For this purpose, the bolts 310 are loosened to permit disengagement between the toothed interfaces of the connectors 312 and 314, the connectors 312 and 314 are next pivoted relative to one another to provide the desired degree of angularity, and the bolts 304 are then drawn up tight to fix the blades 308 in their adjusted positions.

Although the blades 308 could be made as one continuous length of finishing blade, the blades 308 are preferably individual and arranged in the end-to-end relation illustrated because each of the relatively flexible blades 308 is thereby able to individually accommodate itself to a general irregularity in the concrete. That is, in those situations where there is a relatively wide depression between two high spots in the concrete, a single blade would tend to bridge the low area and incompletely smooth it. With the individual blades 308, there is better accommodation of the individual blades to the broad curvature of the low area to thereby effect localized smoothing of this low area as well as of the high spots.

The width of the blades 308 is preferably in the proportion shown since it has been found that this relatively narrow width best adapts the blades 308 to negotiation of the curved transition zone between the bottom 34 and the side slope 32 of an irrigation canal. Wide blades would undesirably dig into the side slope 32 as the car 60 begins its uphill travel.

The pressure of the blades 308 upon the plastic concrete is controlled by operation of the pressure control valve 238, which regulates the fluid pressure applied to the pair of hydraulic cylinders 120. Moreover, the pressure indication at the gauge 240 is an indication of the drag of the blades 308 upon the plastic concrete, and affords the operator an indication of the pressure which the blades 308 are exerting upon the concrete.

It is often advantageous to also provide a vibrated finishing pan ahead of the blades 308 to work the concrete into a more plastic state and thereby permit better finishing by the blades 308.

Accordingly, as seen in FIG. 16, a duplicate set of blades 308a are provided ahead of the blades 308, the blades 308a being mounted in identical fashion to the arms of a U-shaped support 288a. The forward extremities of the arms 288a are pivotally mounted to a pair of the vertical elements 174, in the same manner as the mounting shown in FIG. 21 for the arms 288. Moreover, the blades 308a are also tiltable relative to their support rod 306a in a manner which is the same as the arrangement for blades 308.

The blades 308a are vibratable by a usual and conventional fluid actuated vibrator 316 mounted to the rod 306a. Such vibration loosens and renders more fluid to the plastic concrete ahead of the blades 308, and improves the finish of the concrete being worked upon.

Accordingly, with the smoothing apparatus 286 just described, it is possible to smooth or finish plastic concrete on canal side slopes and the like, which would otherwise only be accessible to workmen perched on temporary platforms or the like suspended over the concrete. Heretofore, such workmen had been thought to be indispensable to perform such finishing operations. However, the present apparatus 30 and smoothing apparatus 286 have virtually eliminated any need for finishing by individual workmen, and therefore have greatly reduced the costs of such finishing operations.

Various vibrators have been described herein but it is noted that the vibrators could be any of various types if desired, including electrically, hydraulically, or air actuated types, depending upon the space and the power sources available.

Although the tool means of the present invention can be either the feeding apparatus 132 or the smoothing apparatus 286, there are many occasions where both can be used to advantage, one mounted on one side and the other mounted on the other side of the elongated frame 38. In this manner, a car 60 on one side can be laying strip material 134, and a car 60 on the other side can be finishing the concrete. Also, both the feeding apparatus 132 and the smoothing apparatus 286 can be mounted on one car 60 to accomplish both strip insertion and smoothing in one pass.

Moreover, although considerable emphasis has been made herein with respect to the particular utility of the invention in working upon a canal bottom and side slope, the invention is equally useful in finishing flat expanses of concrete such as in highways, landing strips and the like.

Various other modifications and changes may be made with regard to the foregoing detailed description without departing from the spirit of the invention or the scope of the following claims.

I claim:
1. An apparatus adapted for operation upon an elongated section of plastic concrete, said apparatus comprising:
   an elongated frame for orientation transversely of the elongated section of plastic concrete in overlying relation thereto, including means at its opposite extremities enabling transportation of said frame over successive transverse sections of said concrete, said means spacing said frame above said concrete;
   a car along said frame;
   support structure carried by said car and pivotable below said car into position adjacent said concrete;
   tool means carried by said support structure for operation upon said concrete;
   means connected between said car and said support structure and operable to pivot said support downwardly whereby said tool means engages said concrete; and
   cooperating means on said car and said frame operative to drive said car along said frame, including a chain coextensive with and secured at its opposite extremities to said frame, a sprocket engaged upon said chain and rotatably carried by said car, a hydraulic motor on said car coupled to said sprocket and operative to drive said sprocket for driving said car along said chain, and pressure indicating means operative to indicate the hydraulic pressure required to drive said car whereby the relative drag on said tool means can be determined.

2. An apparatus according to claim 1 wherein said tool means comprises a feeding apparatus having disc means for pressing strip material into said concrete.

3. An apparatus according to claim 1 wherein said tool means comprises a smoothing apparatus having a finishing blade for engaging and smoothing said concrete.

4. An apparatus according to claim 1 wherein said tool means includes a feeding apparatus having disc means for pressing strip material into said concrete, and smoothing apparatus located rearwardly of said feeding apparatus and including a finishing blade for engaging and smoothing said concrete.

5. An apparatus according to claim 1 wherein said support structure includes a parallelogram linkage connecting said tool means to said car whereby the orientation of said tool means remains fixed regardless of the extent of pivotal movement of said support structure below said car.

6. An apparatus according to claim 1 wherein said pressure means includes hydraulic cylinder means operative to forcibly press said tool means against said concrete at selected pressures, according to the pressure applied to said hydraulic cylinder means.

7. An apparatus according to claim 2 and including an elongated guide for said strip material and located forwardly of said disc means; a source of adhesive material in said frame; conduit means connected to said source and said guide for feeding adhesive to said guide, said conduit means terminating adjacent the rearward terminus of said guide for applying said adhesive material to said strip material passing through said guide.

8. An apparatus according to claim 2 and including vibration means located below said disc means.

9. An apparatus according to claim 3 wherein said tool means includes means connected to said finishing blade for adjusting the angle between said blade and said concrete.

10. An apparatus according to claim 2 and vibration means coupled to said disc means for vibration thereof.

11. An apparatus adapted for operation upon an elongated section of plastic concrete to embed an elongated section of joint former strip material in the concrete, said apparatus comprising:

an elongated frame for orientation transversely of the elongated section of plastic concrete in overlying relation thereto, including means at its opposite extremities enabling transportation of said frame over successive transverse sections of said concrete, said means spacing said frame above said concrete;

a car movable along said frame;

support structure carried by said car and pivotable below said car into position adjacent said concrete;

feeding apparatus carried by said support structure for embedding an elongated section of joint former strip material in said concrete;

pressure means connected between said car and said suport structure and operable to pivot said support structure downwardly whereby at least a portion of said feeding apparatus is forced into said concrete under pressure; and cooperating means on said car and said frame operative to drive said car along said frame, including means operative to indicate the relative force required to drive said car whereby the drag exerted upon the embedded strip material can be determined.

12. An apparatus adapted for operation upon an elongated section of plastic concrete or the like, said apparatus comprising:

a frame for orientation in overlying relation to the elongated section of plastic concrete;

a source of sealant material on said frame;

means carried by said frame for embedding an elongated section of joint former strip material in said concrete, including an elongated guide for guiding said strip material beneath the surface of said concrete; and tubular means connected to said source and located for discharging adjacent the discharge end portion of said guide to extrude sealant material onto said strip just prior to the point where said strip leaves the discharge end of said guide and becomes submerged in said concrete.

13. An apparatus according to claim 12 and including means connected to said source and repetitively operable to effect extrusion of sealant material from said tubular means at selected intervals.

14. An apparatus according to claim 12 wherein said elongated guide is cruciform in transverse cross section and includes lateral wings to accommodate the lateral wings of similarly cruciform configured joint former strip material, and wherein said tubular means terminate adjacent the underside of said lateral wings of said elongated guide.

References Cited

UNITED STATES PATENTS

| | | | |
|---|---|---|---|
| 2,453,510 | 11/1948 | Jackson | 94—48 |
| 2,373,828 | 4/1945 | Harrington | 94—45 |
| 3,071,051 | 1/1963 | Martin | 94—50 |
| 3,274,906 | 9/1966 | Worson et al. | 94—39 |
| 3,359,875 | 12/1967 | Reider | 94—46 XR |
| 3,368,465 | 2/1968 | Tonjes | 94—39 |
| 3,395,627 | 8/1968 | Barton | 94—39 XR |

JACOB L. NACKENOFF, Primary Examiner

U.S. Cl. X.R.

94—51

PO-1050
(5/69)

UNITED STATES PATENT OFFICE
CERTIFICATE OF CORRECTION

Patent No. 3,478,655      Dated November 18, 1969

Inventor(s) D. W. Rasmussen

It is certified that error appears in the above-identified patent and that said Letters Patent are hereby corrected as shown below:

Column 5, line 66, after "vertical" insert --members--.
Column 9, line 19, delete "pin" and insert --pan--.
Column 9, line 56, delete "spoil" and insert --spool--.
Column 14, line 56, after "car" insert --movable--.
Column 14, line 62, after "support" insert --structure--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents